(12) United States Patent
Luijten et al.

(10) Patent No.: US 11,163,715 B1
(45) Date of Patent: Nov. 2, 2021

(54) CGRA ACCELERATOR FOR WEATHER/CLIMATE DYNAMICS SIMULATION

(71) Applicants: INTERNATIONAL BUSINESS MACHINES CORPORATION, Armonk, NY (US); ETH Zurich, Zurich (CH)

(72) Inventors: Ronald Peter Luijten, Thalwil (CH); Gagandeep Singh, Zurich (CH); Joost VandeVondele, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/866,121

(22) Filed: May 4, 2020

(51) Int. Cl.
*G06F 13/40* (2006.01)
*G06F 17/13* (2006.01)

(52) U.S. Cl.
CPC .......... *G06F 13/4027* (2013.01); *G06F 17/13* (2013.01)

(58) Field of Classification Search
CPC .............................. G06F 13/4027; G06F 17/13
See application file for complete search history.

(56) References Cited

U.S. PATENT DOCUMENTS

| | | | | |
|---|---|---|---|---|
| 8,949,550 B2* | 2/2015 | Choi | ................... | G06F 15/7871 711/147 |
| 2013/0024621 A1* | 1/2013 | Choi | ................... | G06F 15/7871 711/129 |
| 2016/0246602 A1* | 8/2016 | Radhika | ................. | G06F 9/3804 |
| 2017/0123794 A1 | 5/2017 | Chen | | |
| 2017/0371836 A1* | 12/2017 | Langhammer | .......... | G06F 30/34 |
| 2018/0285385 A1* | 10/2018 | West | .................... | G06F 9/44505 |
| 2019/0042513 A1 | 2/2019 | Fleming, Jr. | | |
| 2019/0147323 A1* | 5/2019 | Li | .......................... | G06N 3/063 706/15 |
| 2019/0205734 A1* | 7/2019 | Guntoro | ................. | G06N 3/063 |
| 2019/0317770 A1 | 10/2019 | Sankaralingam | | |
| 2020/0250539 A1* | 8/2020 | Liu | ....................... | G06N 3/0481 |

(Continued)

OTHER PUBLICATIONS

Bjorn De Sutter, Coarse-Grained Reconfigurable Array Architectures, Ghent University, (Year: 2019).*

(Continued)

*Primary Examiner* — Henry Tsai
*Assistant Examiner* — Christopher A Daley
(74) *Attorney, Agent, or Firm* — Robert C. Bunker

(57) ABSTRACT

A coarse-grained reconfigurable array accelerator for solving partial differential equations for problems on a regular grid is provided. The regular grid comprises grid cells which are representative for a physical natural environment wherein a list of physical values is associated with each grid cell. The accelerator comprises configurable processing elements in an accelerator-internal grid connected by an accelerator-internal interconnect system and memory arrays comprising memory cells. The memory arrays are connected to the accelerator-internal interconnect system. Selected ones of the memory arrays are positioned within the accelerator corresponding to positions of the grid cells in the physical natural environment. Thereby, each group of the memory cells is adapted for storing the list of physical values of the corresponding grid cell of the physical natural environment.

16 Claims, 8 Drawing Sheets

(56) References Cited

U.S. PATENT DOCUMENTS

2021/0011770 A1\*  1/2021  Prabhakar ............. G06F 9/5027
2021/0064568 A1\*  3/2021  Wang ...................... G06F 7/483

OTHER PUBLICATIONS

Chen et al., "Graph Minor Approach for Application Mapping on CGRAs," ACM Transactions on Reconfigurable Technology and Systems, vol. 7, No. 3, Article 21, Aug. 2014, p. 21.1-21:25.
Fuhrer et al., "Near-global climate simulation at 1 km resolution: establishing a performance baseline on 4888 GPUs with COSMO 5.0," Geosci. Model Dev., 11, pp. 1665-1681, 2018.
Wong, Screen captures from YouTube video clip entitled: "HC31-K2: What Will the Next Node Offer US?," Published on Sep. 5, 2019, Retrieved from Internet: <https://www.youtube.com/watch?v=O5UQ5OGOsnM>.
Takeuchi et al., "A Distributed Memory Based Embedded CGRA for Accelerating Stencil Computations," 2015 Third International Symposium on Computing and Networking, IEEE, 2015, pp. 385-391.
Yuttakonkit et al., "Performance Comparison of CGRA and Mobile GPU for Light-field Image Processing," 2016 Fourth International Symposium on Computing and Networking, IEEE, 2016, pp. 174-180.

\* cited by examiner

600

CGRA ACCELERATOR FOR WEATHER/CLIMATE DYNAMICS SIMULATION

BACKGROUND

The present invention relates generally to a coarse-grained reconfigurable array (CGRA), and more specifically, to a CGRA accelerator for solving partial differential equations for problems on a regular grid. The invention relates further to a method for solving partial differential equations using a coarse-grained reconfigurable array accelerator for problems on a regular grid, and a computer program product.

A consequence of the slowly ongoing climate change is the need for more and more precise weather predictions and climate simulations. In order to achieve this, a higher resolution of the models used, and thus, a smaller cell size may be beneficial. Additionally, planned exascale machines expected in the near future may still have a factor 200 shortfall to achieve the higher performance requirements using traditional CPUs (central processing unit) and GPU (graphic processing unit) accelerators. This estimation is based on a required simulation at kilometer scale resolution, i.e., at a resolution of the weather prediction models and climate simulation models with a cell size of 1 km*1 km. Today, the cell size is much larger because of the long calculation time.

Furthermore, the current combination of CPUs and GPUs may not have sufficient power efficiency envisioned for solving large scale PDEs (partial differential equations).

On the other side, the existing libraries for the model calculation to be performed—still often programmed in classical FORTRAN programming language—cannot be changed easily in order to be adapted to new computing architectures or new types of accelerators. One of the grounds for this is that composed stencil computer kernels for structured grids are often used for weather/climate codes, such as COSMO (COnsortium for Small MOdeling), ICON, etc. Another problem may be found in the fact that traditional architectures have to move in data and intermediate results too often between memory locations in order to achieve high efficiency.

Additionally, similar bottlenecks may be found in other technical areas, such as simulations of seismic activities, in the field of oil and gas exploration as well as other fields in which PDEs have to be solved on regular grids. Thus, solving the task ahead for weather and climate model calculations may also open up new options in other technical fields.

However, the simple construction resulting in only slight improvements of course-grained configurable arrays (CGRA) may not be enough to solve the performance bottlenecks for large scale PDE based computations for problems and regular grids.

Hence, there may be a need for a more efficient computing base for solving large scale PDEs on regular grids with a reduced energy consumption need and superfluous performance reducing data movements.

SUMMARY

According to one aspect of the present invention, a coarse-grained reconfigurable array accelerator for solving partial differential equations for problems on a regular grid may be provided. The regular grid may comprise grid cells being representative for a physical natural environment. Thereby, a list of physical values may be associated with each grid cell.

The accelerator may comprise configurable processing elements in an accelerator-internal grid connected by an accelerator-internal interconnect system, and memory arrays comprising memory cells. Thereby, the memory arrays may be connected to the accelerator-internal interconnect system. Selected ones of the memory arrays may be positioned within the accelerator corresponding to positions of the grid cells in the physical natural environment, and each group of the memory cells may be adapted for storing the list of physical values of the corresponding grid cell of the physical natural environment.

According to another aspect of the present invention, a method for solving partial differential equations using a coarse-grained reconfigurable array accelerator for problems on a regular grid may be provided. The regular grid may comprise grid cells which may be representative for a physical natural environment. A list of physical values may be associated with each grid cell. The configurable processing elements may be connected to an accelerator-internal grid by an accelerator-internal interconnect system, memory arrays may memory cells. Thereby, the memory arrays may be connected to the accelerator-internal interconnect system, and the method may comprise positioning selected ones of the memory arrays the accelerator such that they correspond to positions of the grid cells in the physical natural environment, and storing the list of physical values of the corresponding grid cell of the physical natural environment in each group of the memory cells.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
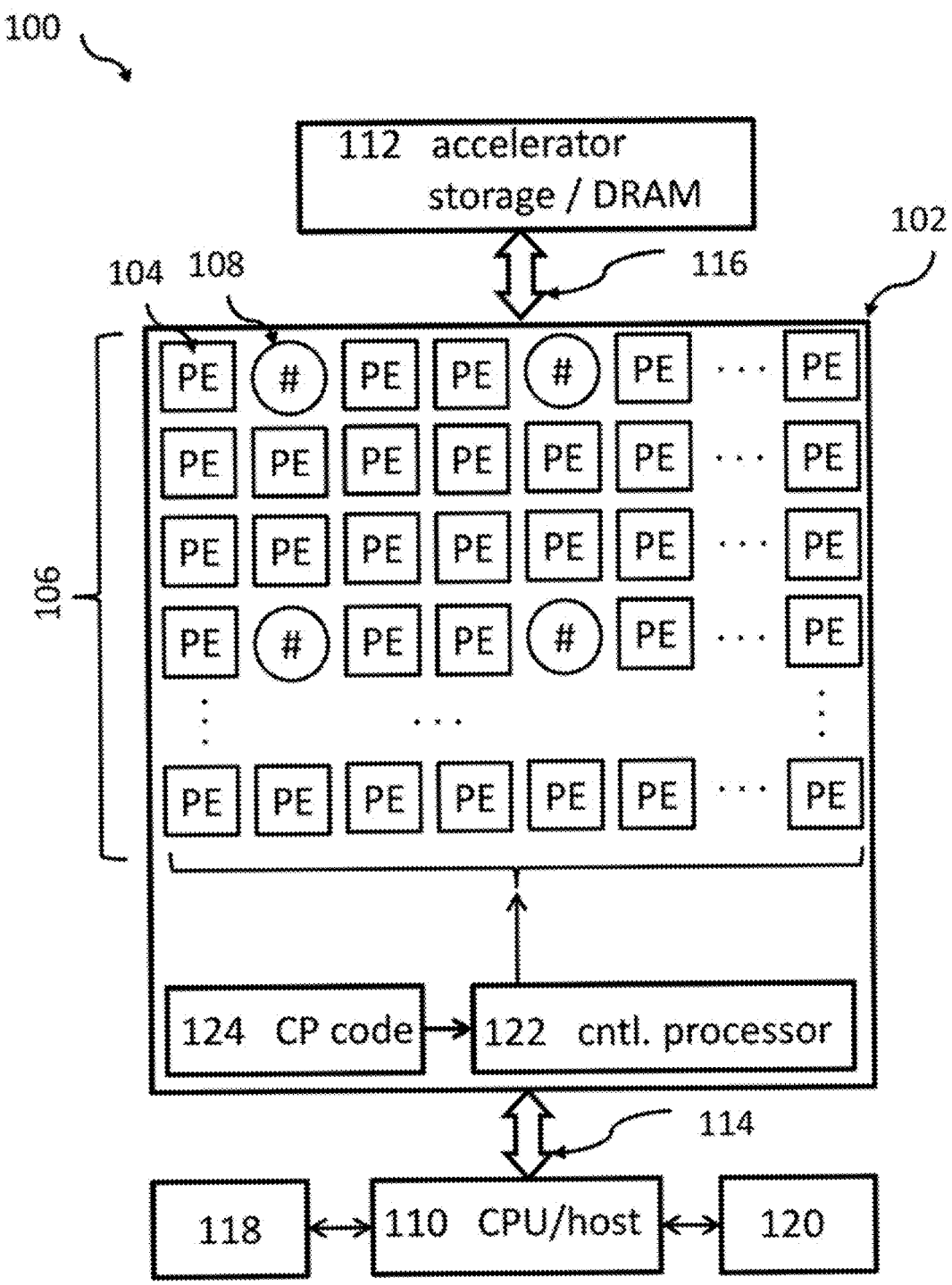
FIG. 1 is a block diagram of the inventive coarse-grained reconfigurable array (CGRA) accelerator for solving partial differential equations for problems on a regular grid according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

In the context of this description, the following conventions, terms and/or expressions may be used:

The term 'coarse-grained reconfigurable array' (CRGA) may denote an integrated array of a large number of functional units (processing elements and cache/memory arrays) by a configurable interconnect network. Register files are distributed throughout the CGRA to hold temporary values and are accessible only by a subset of functional units. The functional units may execute common word-level operations, including addition, subtraction, and multiplication (optionally, also additional operations). CGRAs may allow short reconfiguration times—in particular between operation cycles—low delay characteristics, and lower power consumption as they are constructed from standard cells implementations. Consequently, they are computationally highly effective. On the other side, an optimized compiler may be required to exploit the full functionality and computational power of CGRAs.

The term 'partial differential equation' (PDE) may denote—in mathematics—a differential equation which contains unknown multivariable functions and their partial derivatives. They may be used to formulate problems involving functions of several variables, and are typically used to create a computer model. PDEs are thus suited to describe phenomena such as weather, seismic effects, fluid dynamics, and other multidimensional systems.

The term 'regular grid' may denote a raster with a constant topology between the raster points. The here used raster may be a 3-dimensional raster. In a weather model, the cell size which may surround a raster point may be 1 km*1 km. Current models typically use a larger cell size. Again for a weather model, for each cell, a plurality of physical values is used as a basis for the underlying mathematical model. Typically, the physical variables are dependent from each other and their dependencies may be described as a set of partial differential equations. Regular grid calculations—or more precisely, a set of mathematical equations in which measurement values are partially known or measured—may also be done in other technical fields, such as simulations or predictions about seismic activities of planets, in the technical field of oil and gas exploration, etc.

The term 'physical natural environment' may simply denote nature and/or everything that surrounds us, such as rocks, earth, the earth's atmosphere, etc. However, the present invention may also be used for predictive tasks for other planets or moons.

The term 'physical values' may denote measured values or calculated values in models. In case of a weather model or a climate model to be determined over time, the physical values may comprise temperature, wind speed, pressure, humidity, ozone level, carbon-dioxide level, dust concentration, and other impurities/pollution values, just to name a few.

The term 'configurable processing element' may denote a portion of a CGRA which is not a memory array. These processing elements and the interconnect may be reconfigured from processing cycle to processing cycle, controlled by a control processor of the CGRA. The configurability comprises from which caches or memory arrays data are fetched, where they are stored, and what kind of mathematical operation (e.g., addition, subtraction, multiplication, etc.) may be performed.

The term 'memory cell' may denote a storage element adapted for storing real values (in the mathematical sense). Memory cells may be, e.g., 16, 32 or 64 bits in size. Because the COSMO model can be configured to float (32 bit) or double (64 bit) precision, the memory cells, and consequently the memory arrays may be configurable to have the same capacity.

The term 'memory array' may denote a plurality of memory cells which may be addressed as one field. As an example, for the weather or climate model, the memory array may be adapted for storing the complete set of physical values available for a cell.

The term 'first external bus' may denote a multi-wire connection for a parallel data transfer using a predefined protocol to and from the CGRA, e.g., to a memory subsystem, such as the external accelerator memory. The bandwidth may be comparably high, e.g., 500 MB/sec. An example of such bus system may be an HBM2 (having, e.g., a bandwidth of up to 1 TB/sec) or CXL (Computer Express Link) which is an open standard interconnect for high-speed CPU-to-device and CPU-to-memory data exchange. CXL is built upon the known PCI express interface (PCIe). However, also other high speed bus systems may be suitable here.

The term 'external accelerator memory' may denote a storage system which may directly connected to the CGRA as intermediate data storage for calculation results or for start values of the calculations and determinations made by the CGRA.

The term 'second external bus' may denote a second bus system access to the accelerator from, e.g., a host controlling the operations of the CRGA and building the user interface for the accelerator. The host may control the structuring framework for the determination of the model results to be determined. The bandwidth of the second bus may be smaller than of the first external bus because the requirements continue to remain less. However, the architecture comprising the host, the second external bus, the accelerator, the second system bus, and the DRAM, attached to the second system bus, may allow a mapping of the DRAM of the accelerator to the host kernel space.

The term 'stencil computing' may denote the known assignment of values to elements of an array by an expression that involves arrays indexed by some function of the indices used for assigning it to the target. Stencil computations are common in numerical code, and hence, in scientific computing. One known example may be the Laplace transformation in 2-D. Another example may be the 7-point 3D von Neumann style stencil in which a new value for a central cube may be assigned based on the value of the central cube and the surrounding six adjacent cubes.

The term 'stencil computing kernel' may denote a program library available for determining values for specific stencils according to a predefined stencil algorithm. Stencil computing kernels may be used to update array elements according to some fixed pattern, called stencil, as they are typically found in computational fluid dynamics, such as climate or whether models. However, also other comparable natural phenomena may be simulated using stencil computing, such as an earthquake prediction, oil and/or gas exploration, and the like.

The term 'horizontal diffusion compute stencil kernel' may denote a specific computing library to be used by a CGRA adapted for a computation of cell of grid elements in the x-y plane. If a weather/climate model is assumed, a horizontal diffusion compute stencil kernel may be used to update grid cells which are positioned horizontally to the Earth surface.

The term 'vertical advection compute stencil kernel' may denote a specific computing library for a vertical advection operation. This may be seen as a advection effect in which only vertical grid cells are reflected in the conjugation. Typically, horizontal calculations and vertical calculations may be alternated.

The proposed coarse-grained reconfigurable array accelerator for solving partial differential equations for problems on a regular grid may offer multiple advantages, contributions and technical effects:

The system architecture integrating the CGRA as proposed—i.e., whether the specific organization of processing elements and caches within the CGRA—may allow a much faster time to solution of a plurality of dependent partial differential equations (PDEs) typically used for weather and/or climate models. By the shrinking the time required for a determination of a new weather prediction, a smaller grid size may become possible for a more precise and more reliable prediction or shorter prediction times. This may be used by the population to prepare for extreme weather situations which may result in avoiding dangerous situations for people, assets and goods (e.g., houses, cars, bridges, . . . ).

By organizing caches (and processing elements) in this CGRA for storing physical measured values and of grid cells of the natural environment (e.g., the atmosphere) that correspond to the grid cells, the access paths to the so stored data from processing elements is significantly shrinking. Additionally, using stencil computing an access to caches may only be required for processing elements being positioned between the relevant caches or memory arrays. Because the typically used stencil computing for such prediction models only requires an access to surrounding cells in the grid, also the processing elements in the CGRA only need to access surrounding caches/memory cells. Thus, computing is brought to the memory thereby avoiding unnecessary, power and time-consuming data movements. Because the cells of the memory array may be implemented dual-ported each clock cycle may be used for one computing step.

Because of the arrangement of processing elements and memory arrays in the CGRA and its reconfigurability, none of the clock cycles may be wasted for data movements. Data for each grid point (compare, e.g., FIG. 3, "A", "B") may only be read once from the CGRA storage, i.e., CGRA DRAM for the compute sweep across an entire grid, each CGRA DRAM read operation may result in all data being used (i.e., no overhead data movement), and each CGRA DRAM read and write operated at peak bandwidth of the related bus for all data being used, i.e., 100% bus utilization.

This may also allow a 100% utilization of the bus system between the CGRA and the related accelerators storage. Before a new iteration of the underlying stencil computing is performed, the required accelerator storage cells are mapped to the respective caches/memory arrays of the CGRA. This may be performed on the runtime control, i.e., the CGRA control program determining the function of the CGRA internal control processor. Thus, in the same clock cycle all input fields are pre-fetched from the accelerator DRAM before stencil computing and on output fields are written back to the accelerator DRAM after the stencil computing. Thus, stencil computations may overlap field pre-fetch and write-back to the accelerator DRAM.

This inventive placement of the processing elements and memory (cache) arrays may also allow an implementation as ASIC (application specific integrated circuit) because no global data busses are required. Only local wiring may be used to nearest neighbors.

In a nutshell, the proposed arrangement of processing elements and memory arrays in a CGRA completely symmetrical to grid cells of a natural environment model may allow a much faster determination, using stencil computing, of a set of PDEs modeling natural phenomena reducing risk for humans and hazardous situations.

Even with the exascale system expected in the near future, a global climate prediction for the next 50 years is not possible because of the shortfall of compute power by a factor of 200-400. However, the here proposed concept and architecture may enable such a long term global climate prediction.

In the following, additional embodiment of the CGRA—also applicable to the method—will be described:

According to one embodiment of the accelerator, the positioning of the memory arrays may be equivalent to an x-y positioning—or in terms of the terminology used in the weather models—of the grid cells in the physical natural environment. Thus, a direct mapping may be achieved such that those memory locations having related data—e.g., for neighboring cells in the physical environment—may also be positioned with the physical layout of the accelerator side-by-side in the grid-like structure. This may result in only a few data movements from memory locations to processing units, and thus, it may be energy efficient and high performing.

According to another embodiment of the accelerator, the list of physical values of a selected grid cell of the physical natural environment may be mapped to multiple, e.g., two—memory arrays. Thus, the list of physical values of the same cell may be stored twice in the accelerator. This may allow a vertical access to the same data field at the same time. In particular, for building cell correlations in a vertical direction, i.e., z-direction (or k direction in the terminology of the weather models), such a double storage may be advantageous because a parallel accessing may easily become possible supporting the high speed processing.

According to another embodiment of the accelerator, the memory arrays may have multiple read and write ports, i.e., they may be dual ported. Hence, reading and writing may be done in the same clock cycle. Also, this feature may support the highest possible computing speed of the CGRA.

According to one additional embodiment of the accelerator, the accelerator may comprise a first external bus adapted for connecting an external accelerator memory. This memory unit may, in some implementations, only be accessible by the accelerator. The bus data speed may be comparably high, e.g., 450 MB/sec, using DDR4 (Double Data Rate) RAMs; an HBM2 (High Bandwidth Memory) bus system may be used which may allow a high-speed mapping of data from the external accelerator memory to the memory arrays within the accelerator. Additionally, the address space of the host may be mapped to the external accelerator memory.

According to another embodiment, the accelerator may comprise a second external bus adapted for connecting a host computer to the accelerator. In contrast to the external accelerator memory, the host computer may control the function of the processing of the accelerator, provide initiating commands and function as an IO device for the data used by the processor, as well as for further processing the results of the accelerator. It may be implemented according to OpenCAPI or CXL specifications. It may be the case that the data exchange speed is not as relevant as the bandwidth of the bus connecting the external accelerator memory to the accelerator.

According to one further embodiment of the accelerator, the accelerator may be adapted for solving the partial differentiable equations using a plurality of stencil computing kernels. They may represent a library of operations optimized for a specific class of stencil computations.

According to one further embodiment of the accelerator, a horizontal compute stencil kernel may have operand access in an x-y plane, and a vertical compute stencil kernel may have operand access in a plane vertical to the x-y plane. Furthermore, a determination of horizontal stencil computation results and vertical stencil computation results may be alternated. This last mentioned feature may in particular be helpful in a determination of results for weather models.

According to one embodiment, the accelerator may be adapted to be reconfigured between different stencil compute kernels, i.e., between computing modes, such as horizontal diffusion forward, horizontal diffusion backward, and vertical advection in case of a weather model.

According to a further embodiment of the accelerator, the accelerator may be adapted for an overlapping of fetching of data from an accelerator external memory for a next stencil computing cycle and a current stencil computing cycle across the entire grid. Thus, the speed of the available accelerator may be used to its maximum capacity.

In the following, a detailed description of the figures will be given. All instructions in the figures are schematic. Firstly, a block diagram of an embodiment of the coarse-grained reconfigurable array accelerator for solving partial differential equations for problems on a regular grid is given. Afterwards, further embodiments, as well as embodiments of the method for solving partial differential equations using a coarse-grained reconfigurable array accelerator for problems on a regular grid, will be described.

FIG. 1 shows a block diagram of an architecture 100 of an embodiment of the coarse-grained reconfigurable array accelerator 102 (CGRA) for solving partial differential equations for problems on a regular grid. The regular grid comprises grid cells which are representative for a physical natural environment, wherein a list of physical values is associated with each grid cell.

The CGRA 102 comprises a plurality of configurable processing elements (PE) 104 (squared boxes; only the top left of which having a reference numeral) in an accelerator-internal grid 106 connected by an accelerator-internal interconnect system (not shown).

The CGRA 102 also comprises memory arrays 108 in the form of on-chip caches (circles with a '#' sign in the middle; only one of which has a reference numeral) comprising memory cells (not shown explicitly). The memory arrays 108 are also connected to the accelerator-internal interconnect system (not shown).

Selected ones of the memory arrays 108 are positioned within the accelerator corresponding to positions of the grid cells in the physical natural environment. This way, variables relating to the grid cells representative for a physical natural environment are stored in memory arrays 108 identically positioned relative to each other as their real world corresponding equivalents. Hence, data for two adjacent grid cells in, e.g., the atmosphere for a weather model are also stored in adjacent memory arrays 108—i.e., being positioned relatively closely to the each other. This may not mean that the memory arrays 108 are positioned side-by-side to each other. Instead, PEs 104 may be positioned between them. However, these processing elements have now very short access paths to access data relating to each other—in particular in the case of stencil computing.

Consequently, each group of the memory cells—which make up the memory array 108—is adapted for storing the list of physical values of the corresponding grid cell of the physical natural environment.

FIG. 1 also shows an exemplary architecture comprising a host computer 110 besides the CGRA 102 and the accelerator storage 112 (or accelerator DRAM). This is connected via a high-speed bus system, i.e., the second system bus 116, to the CGRA 102. The accelerator storage 112 may only be accessible by the CGRA 102 directly. This second system bus 116 can, e.g., be an HBM2 (High Bandwidth Memory) variant bus system allowing, e.g., a bandwidth of up to 1 TB/sec (with 4 HBM2 modules in parallel). It may be noteworthy that the accelerator DRAM address space may be mappable to the host kernel space.

On the other side, the host computer 110—and the CPU respectively—is connected to the CGRA 102 via first or host bus 114. The host comprises also a host DRAM 118 and a network adapter 120. This first bus may be an OpenCAPI (open Coherent Accelerator Processor Interface) bus system with an exemplary data bandwidth of about 100 GB/sec, today.

The CGRA 102 comprises a control processor 122, the function of which is controlled by the control program. They two elements allow a configuration/reconfiguration of the PEs 104 and the cache memory elements, e.g., memory arrays 108, and the way the PEs 104 access the memory cells. Thus, a compute cycle may comprise configuring the PEs 104, mapping variable from the accelerator storage 112 (e.g. DRAM) to the CGRA 102 internal caches, perform the operation, load the results from the internal caches back to the accelerator storage 112, and reconfigure the CGRA 102 (shown as an arrow influencing the CGRA internal grid) for a next compute cycle. This architecture is well suited for stencil computing.

Figure 2A:
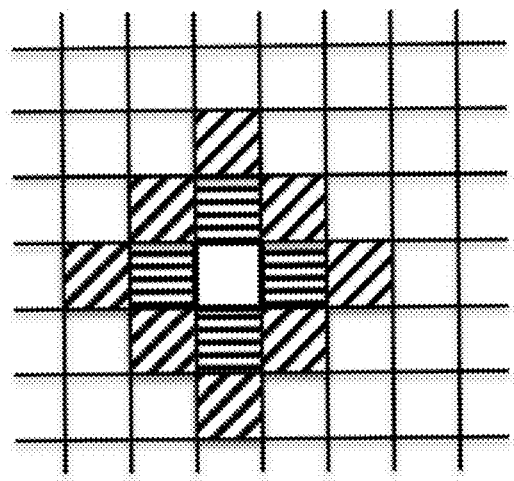
FIGS. 2a-b illustrates an example from a weather or climate model in which horizontal stencils access neighbors only in horizontal plane according to at least one embodiment.
Figure 2B:
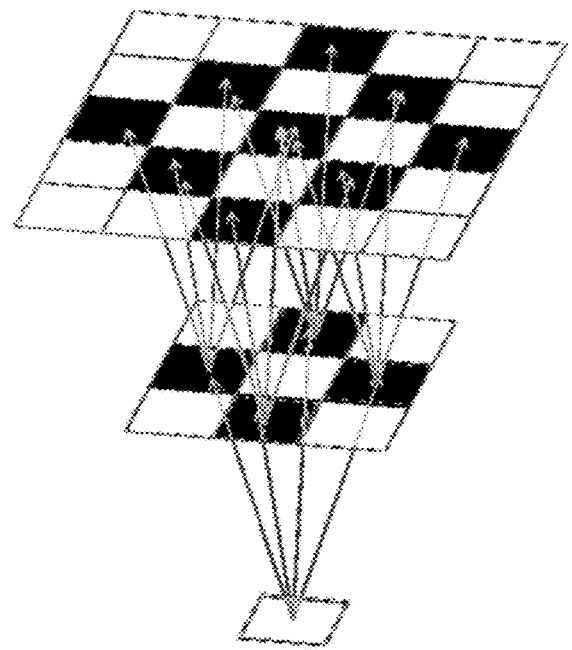

For comprehensibility reasons, FIGS. 2a-b shows an example from a weather or climate model (horizontal diffusion) in which horizontal stencils access neighbors in a horizontal plane only (FIG. 2a) but are executed over the entire three dimensional (3D) grid. The vertical stencils access neighbors only in the vertical dimension, and are also executed over entire 3D grid. The bottom picture (FIG. 2b) show compositions of second order Laplace stencils (top layer) and first order flux stencil functions (middle layer) into the horizontal diffusion stencil (bottom cell as result). Such mapping can be directly translated to the CGRA of FIG. 1.

Thereby, for each determined stencil, i.e., the one in the middle, operands are fetched from an "evaluation point" (in the middle) and close surrounding neighbors via relative addressing. Also typically, stencils are compositions of elementary stencils. In 3D, each computed new stencil may require access to, e.g., 25 surrounding stencils (shown horizontally and diagonally striped squares). However, vertical stencils (accessing stencils in vertical direction only) and horizontal stencils (access only in the plane of the cells, as in FIG. 2b) can alternate; thereby the control processor can be reconfigured between vertical and horizontal stencil computing cycles.

Figure 3:
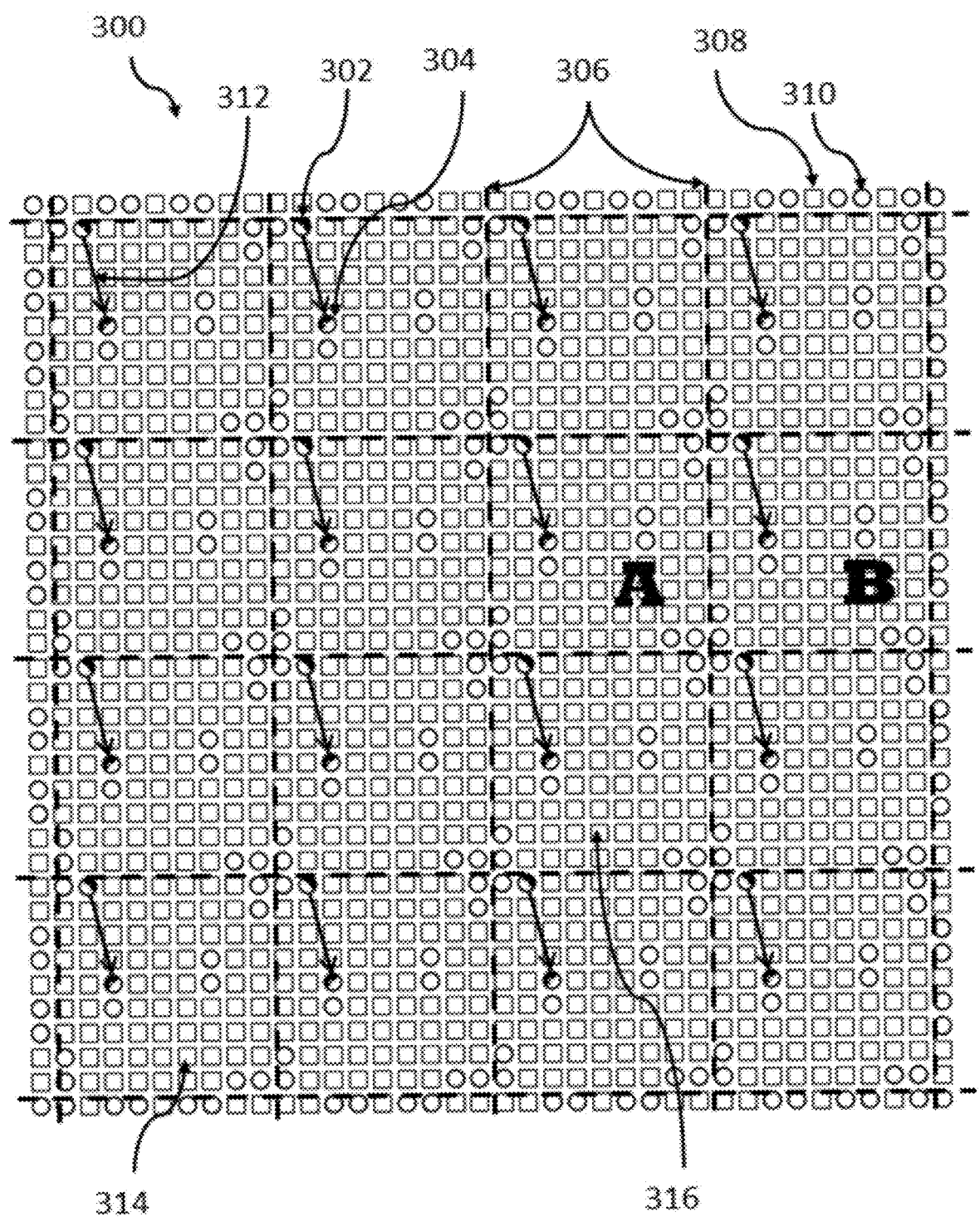
FIG. 3 is a diagram of an exemplary positioning of selected processing elements in an exemplary copy stencil according to at least one embodiment.

FIG. 3 shows a layout of a CGRA chip of a portion of the CGRA embodiment of a copy stencil. The figure shows a 38×38 element of a larger CGRA. The empty squares represent not used processing elements (PE), such as the PEs 308, 314, 316 (compare 104, FIG. 1). Circles show the on-chip caches (compare 108, FIG. 1), i.e., the memory arrays 108. The empty circles show unused memory arrays 310 that are currently—i.e., in the current processing cycle—not used, i.e., not allocated. As already discussed, the PEs 308 may be reconfigured regarding the function—in particular, ADDition, SUBtraction, MULiplication, MUX (multiplexing), Literal and DIVision—from processing circuit to processing cycle of the CGRA.

Circles with a top right black mark are data source 302 memory arrays acting as sources for a data access/copy process, whereas circles with a top left black mark are data sink 304 memory arrays acting as sinks of a copy process. The arrows 312 between the data sources 302 and data sinks 304 indicate the direction of the data movement.

Additionally, the 38×38 grid of PEs 308 and unused memory arrays 310 are divided by vertical and horizontal dashed lines 306 subdividing all elements into 16 9×9 grids of PEs 308, data sources 302, data sinks 304, and unused memory arrays 310. In this embodiment, each 9×9 grid corresponds to a cell of the natural physical environment, so that the unused memory arrays 310 within such a grid are adapted to store the measured variables corresponding to the cell. In the case of the weather model embodiment, this may be temperature, wind speed, humidity, etc. It may also be noted that each of the data sources 302, data sinks 304, and unused memory arrays 310 (collectively, memory arrays) may comprise, e.g., 100 times 4 bytes so that the plurality of measured data values may be stored in the array.

The portion of the CGRA of FIG. 3 shows exemplary data movements; hence, this copy stencil has been used to explain the principle of the figures of the following pages. It may also be noted that each of the grid points comprises only one divide PE 308 because the computational load of a division is high if compared to the other potential operations performed by the PE 308.

The position of the PEs 308, data sources 302, data sinks 304, and unused memory arrays 310, are fixed for a given PDE problem. By this positioning, the data movement and data access path can be kept close to the theoretical minimum. Additionally, cross grid point access is only required to neighboring grid points (compare FIG. 2b), given the supported PDE problem. Hence, the grid point A (the complete 9×9 element grid) and the grid point B correspond to cells of the natural environment that are also adjacent.

Figure 4:
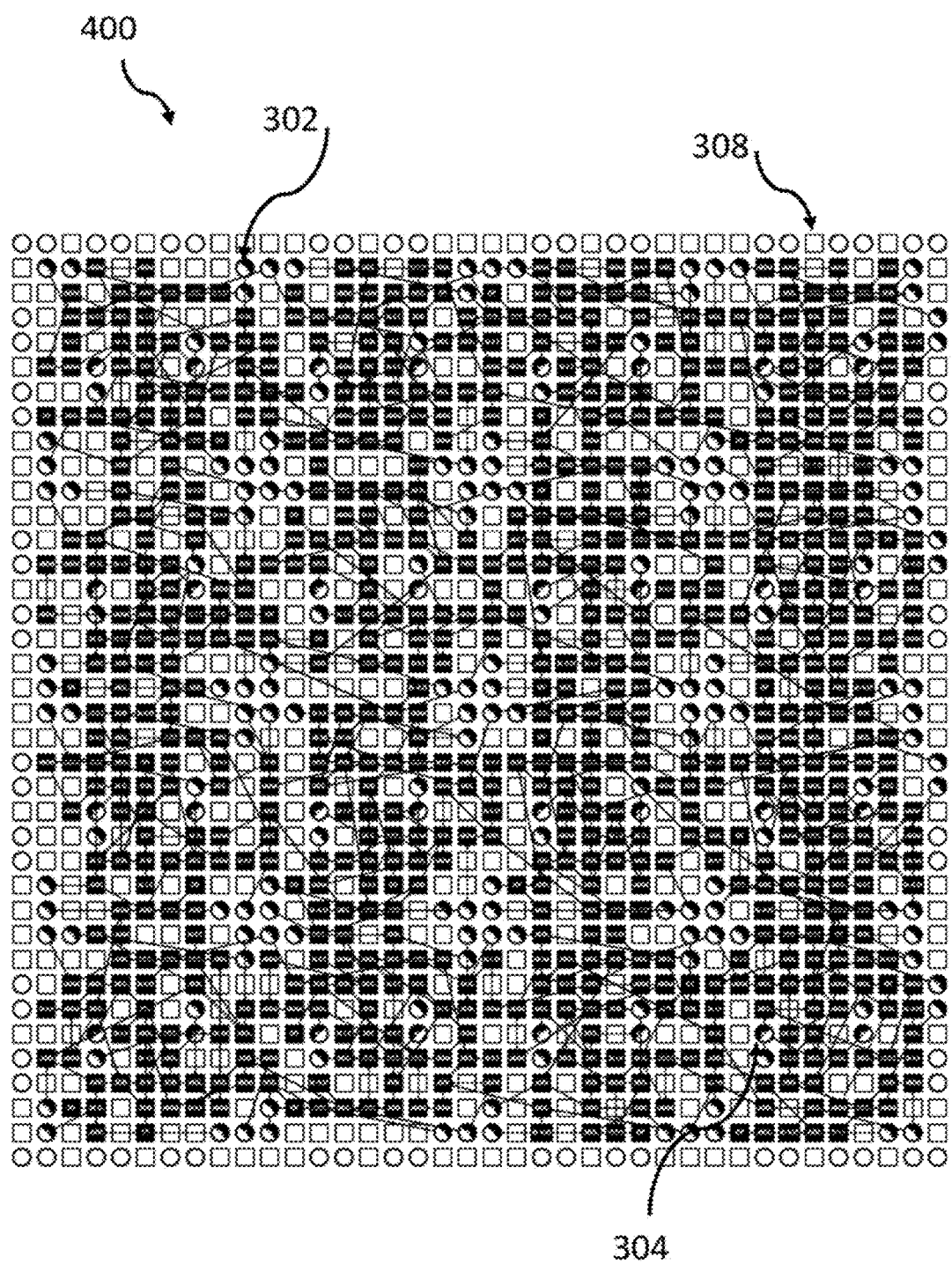
FIG. 4 is a diagram of a CGRA configuration for using processing elements for vertical advection (forward) stencil according to at least one embodiment.

FIG. 4 shows a block diagram 400 of an exemplary configuration of the portion of the CGRA of FIG. 3 for a vertical advection (forward) stencil of the weather model (exemplary grid for a 4×4 vectorization). It may be noted that the vertical and horizontal lines for an indication of the grid structure are not shown. Here, multiple PEs 308 are shown as black squares indicating that these PEs 308 have been configured to be active. The not filled squares show inactive PEs 308. Data sources and data sinks are marked identically if compared to FIG. 3.

Additionally, the plurality of lines is shown between selected ones of the PEs 308, data sources 302, and data sinks 304. The lines indicate access to the memory arrays and work results of the processing are stored. For comprehensibility reasons, arrows as in FIG. 3 are not shown here.

By virtue of the layout of the CGRA—i.e., the positioning of the PEs 308, data sources 302, and data sinks 304—advantageously short connections between the elements of the CGRA are required. In this example, 1056 connections are required. In this example implementation, the minimum Manhattan distance is 1 unit (distance between neighboring elements), the maximum Manhattan distance is 10 units, and the average Manhattan distance is 2.65 units.

Figure 5:
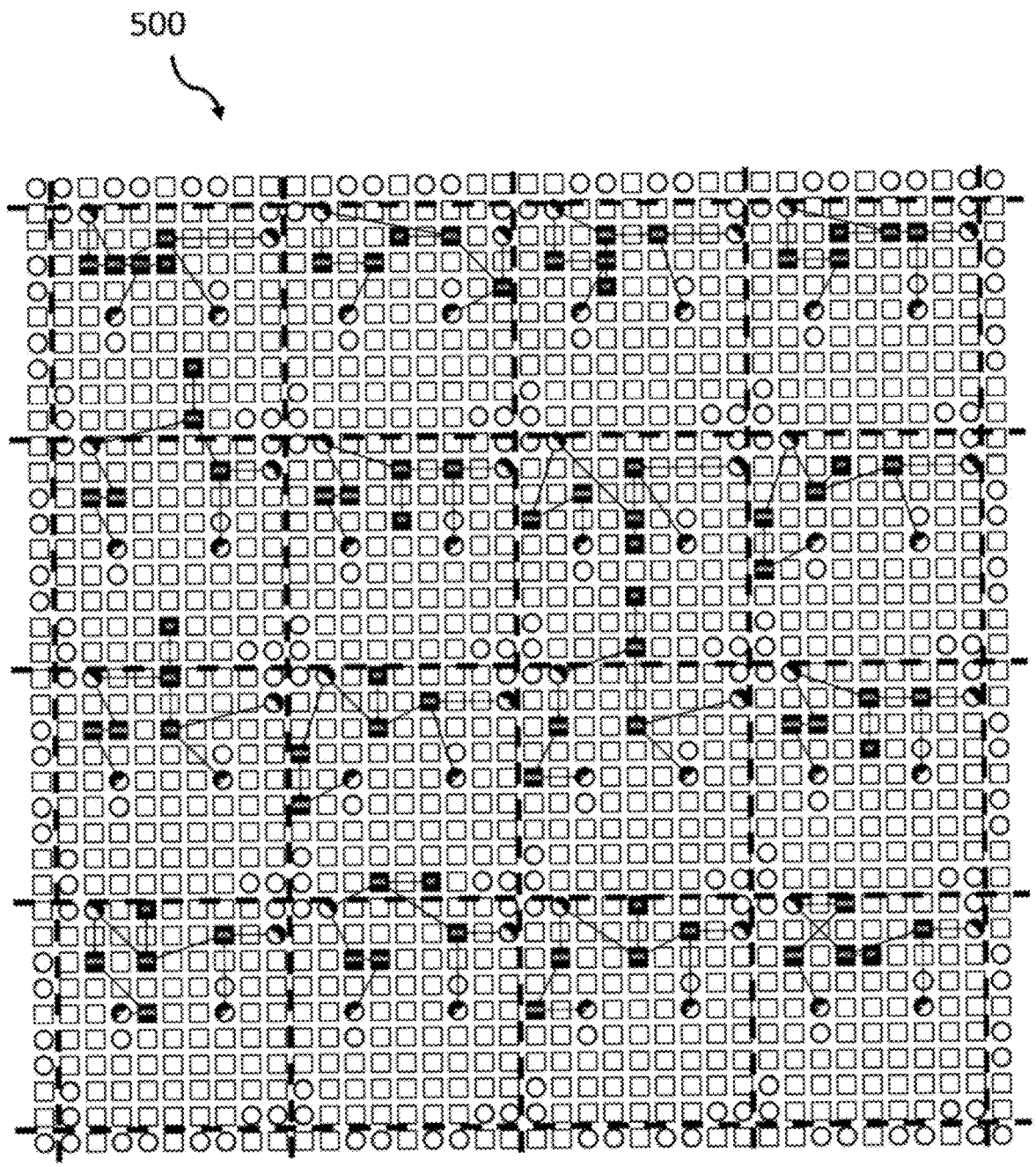
FIG. 5 is a diagram of a CGRA configuration for using processing elements for vertical advection (backwards) stencil according to at least one embodiment.

FIG. 5 shows a block diagram 500 of an exemplary configuration of the portion of the CGRA of FIG. 3 for a vertical advection (backwards) operation/stencil of the weather model. Because this represents another processing cycle, the PEs 308 have been reconfigured in the function in some have been made in active. This backwards vertical advection operation requires much less resources of the CGRA. Hence, only 128 connections from data sources processing elements and data sinks are required in the weather model. Here, the minimum Manhattan distance is 1 unit, the maximum Manhattan distance is 6 units, and the average Manhattan distance is 2.85 units. Because of the less extensive usage of PEs 308, data sources 302, data sinks 304, and unused memory arrays 310, the dotted lines, indicating the sub-division of the portion of the CGRA, are shown again, as they have been shown in FIG. 3 already.

Figure 6:
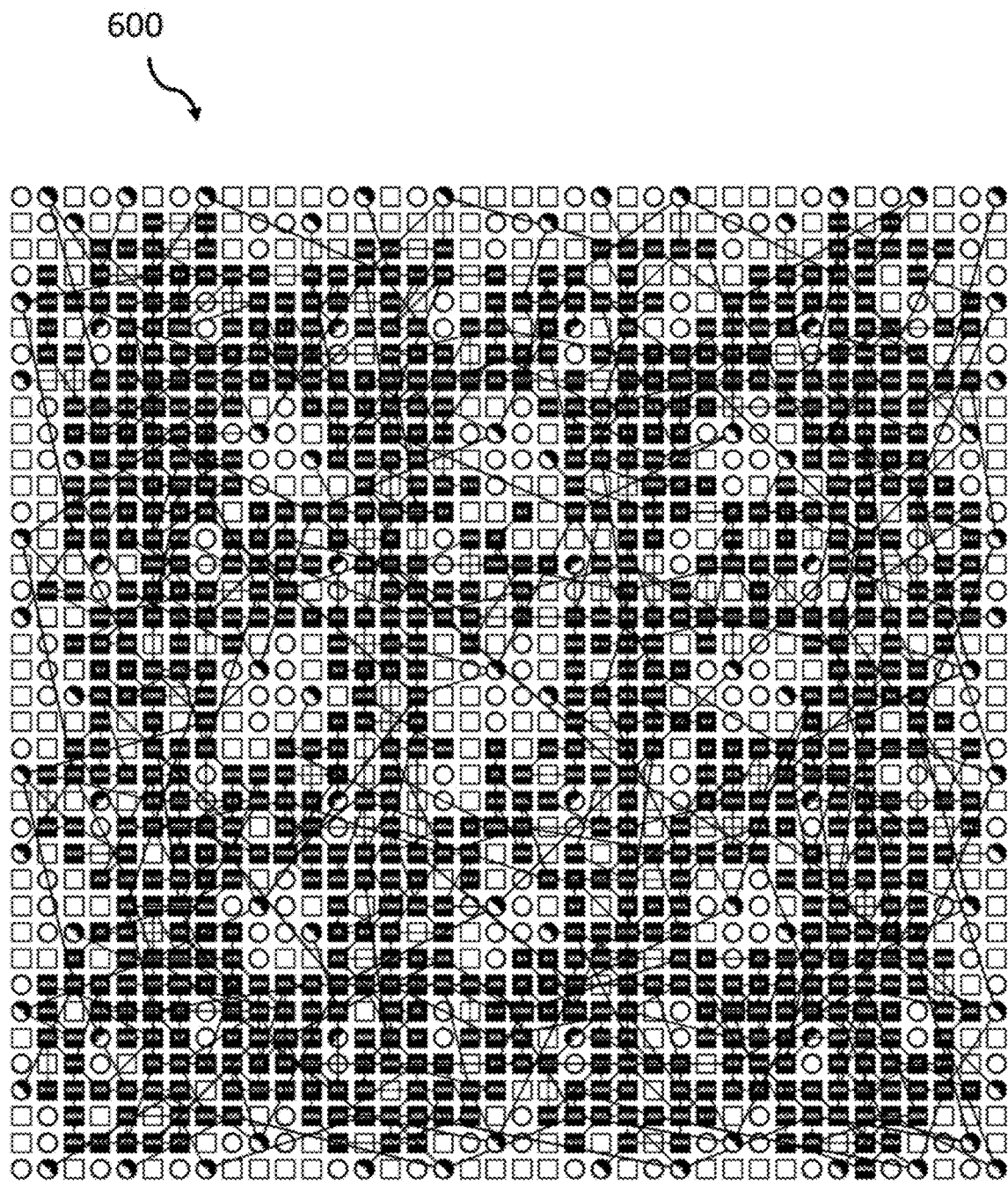
FIG. 6 is a diagram of a CGRA configuration for using processing elements for horizontal diffusion according to at least one embodiment.

FIG. 6 shows a block diagram 600 of an exemplary configuration of the portion of the CGRA of FIG. 3 for a horizontal diffusion operation/stencil of the weather model. Also here, the filled black squares represent active PEs 308, whereas the data sources 302 and data sinks 304 have been marked identically if compared to FIG. 3. Here, it is also visible that the plurality of memory arrays 310 are not filled and thus not used (not allocated) for this processing cycle. Because of the higher complexity of the horizontal diffusion operation/stencil, the number of active PEs 308 is higher if compared to the previous figure. Consequently, also more connections are required. In this case, the minimum Manhattan connection distance is one unit, the maximum Manhattan distance is 14 units and, the average Manhattan distance is 3.27 units.

Because of the chosen layout—i.e., elements of the CGRA equivalent to the positioning of the model cells in the natural environment—the wire lengths can be kept short significantly, the PEs 308 are placed between the data sources 302 and data sinks 304—meaning computing has been brought to the data and not vice versa as in traditional environments—the energy efficiency is better by a factor of about 10 to 50 if compared to traditional architectures.

Figure 7:
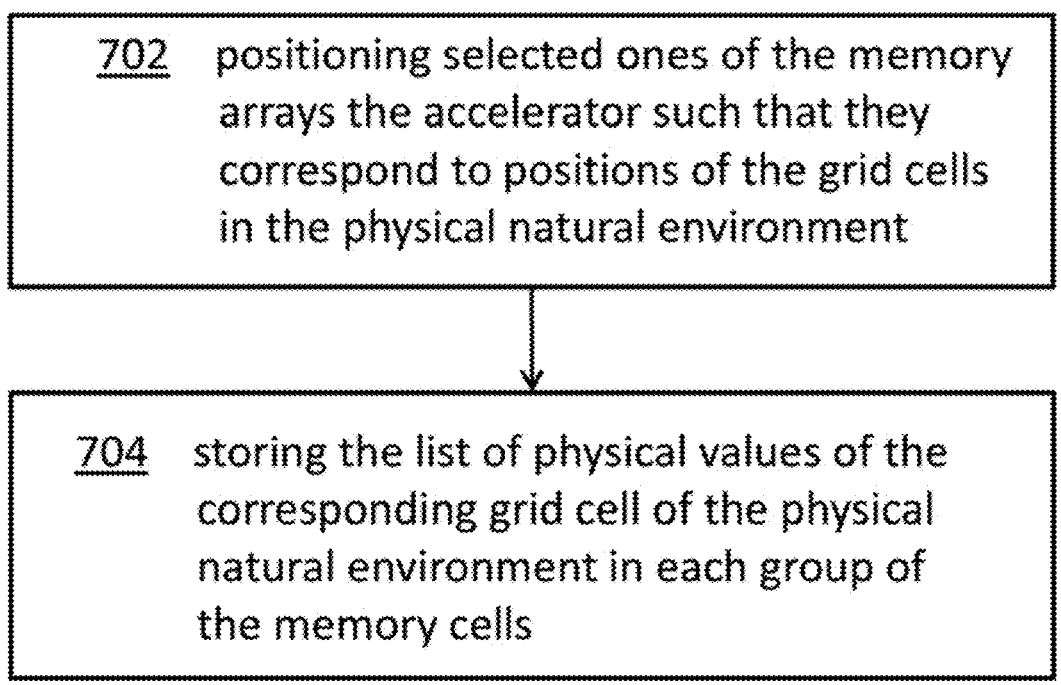
FIG. 7 is an operational flowchart of the method for solving partial differential equations using a coarse-grained reconfigurable array accelerator for problems on a regular grid according to at least one embodiment.

For completeness reasons, FIG. 7 shows an exemplary flowchart of the computer-implemented method 700 for solving partial differential equations using the coarse-grained reconfigurable array accelerator for problems on a regular grid. Also here, the regular grid comprising grid cells is representative for a physical natural environment—i.e., the corresponding model to solve the PDEs—while a list of physical values is associated with each grid cell. Same as above, the configurable processing elements are connected in an accelerator-internal grid by an accelerator-internal interconnect system. Additionally, memory arrays 108 comprise memory cells which are connected to the accelerator-internal interconnect system.

The method 700 comprises positioning, 702, selected ones of the memory arrays the accelerator such that they correspond to positions of the grid cells in the physical natural environment, and storing, 704, the list of physical values of the corresponding grid cell of the physical natural environment in each group of the memory cells.

Figure 8:
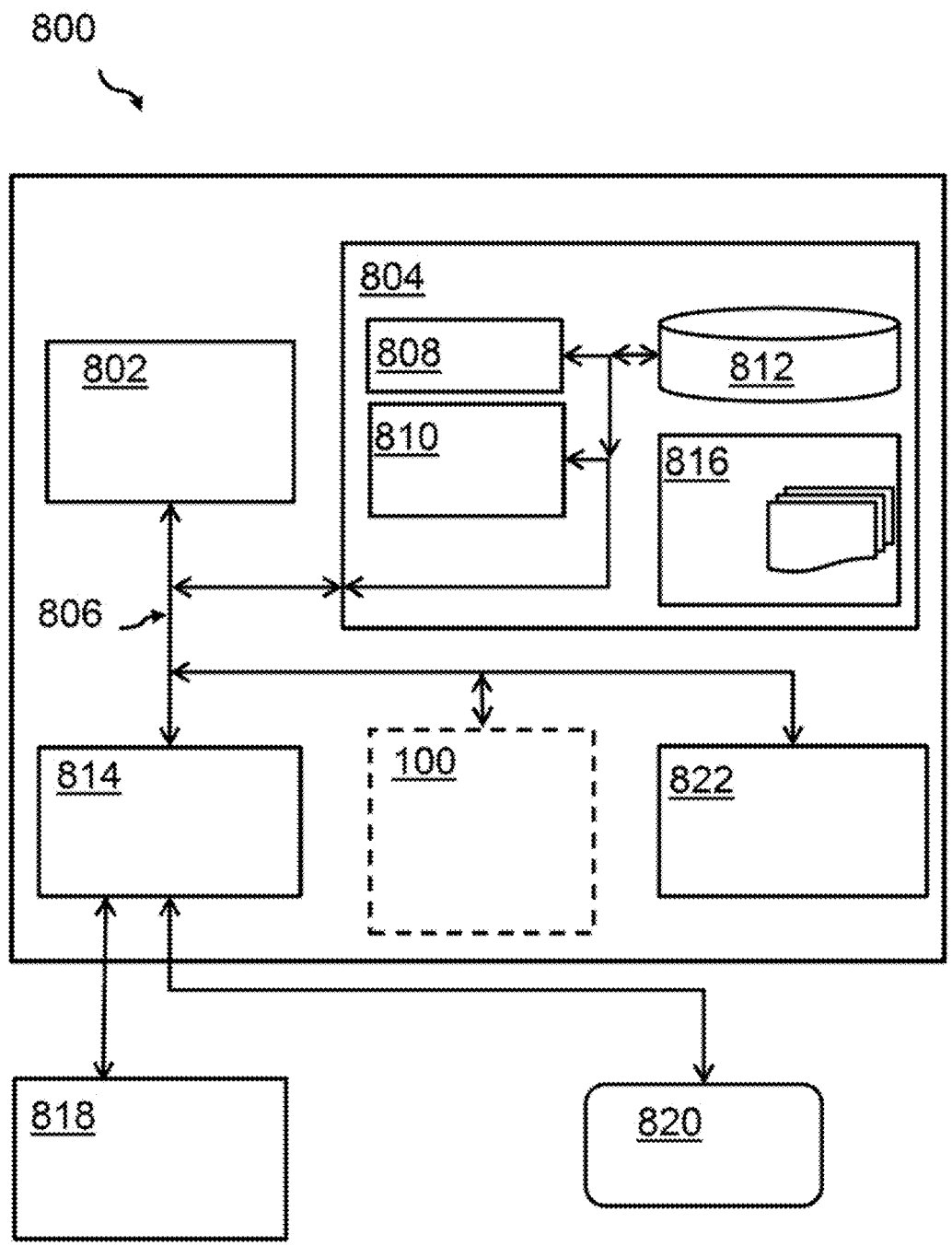
FIG. 8 is a block diagram of a computing system comprising the reconfigurable array accelerator for solving partial differential equations for problems on a regular grid according to at least one embodiment.

Embodiments of the invention may be implemented together with virtually any type of host computer, regardless of the platform being suitable for storing and/or executing program code. FIG. 8 shows, as an example, a host computing system 800 suitable for executing program code related to the proposed method.

The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor units 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the CGRA 102 (compare FIG. 1) can be attached to the bus 806.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized by the following clauses:

1. A coarse-grained reconfigurable array accelerator for solving partial differential equations for problems on a regular grid, the regular grid comprising grid cells being representative for a physical natural environment, wherein a list of physical values is associated with each grid cell, the accelerator comprising
    configurable processing elements in an accelerator-internal grid connected by an accelerator-internal interconnect system,
    memory arrays comprising memory cells, the memory arrays being connected to the accelerator-internal interconnect system, wherein selected ones of the memory arrays are positioned within the accelerator corresponding to positions of the grid cells in the physical natural environment, and wherein each group of the memory cells is adapted for storing the list of physical values of the corresponding grid cell of the physical natural environment.
2. The accelerator according to clause 1, wherein the positioning of the memory arrays is equivalent to an x-y positioning of the grid cells in the physical natural environment.
3. The accelerator according to clause 1 or 2, wherein the list of physical values of a selected grid cell of the physical natural environment is mapped to multiple memory arrays.
4. The accelerator according to any of the preceding clauses, wherein the memory arrays have multiple read and write ports.
5. The accelerator according to any of the preceding clauses, wherein the accelerator comprises a first external bus adapted for connecting an external accelerator memory.
6. The method according to any of the preceding clauses, wherein the accelerator comprises a second external bus adapted for connecting a host computer.
7. The accelerator according to any of the preceding clauses, wherein the accelerator is adapted for solving the partial differential equations using a plurality of stencil computing kernels.
8. The accelerator according to clause 7, wherein a horizontal compute stencil kernel has operand access in an x-y plane, and wherein a vertical compute stencil kernel has operand access in a plane vertical to the x-y plane, and wherein a determination of horizontal stencil computation results and vertical stencil computation results alternates.
9. The accelerator according to clause 8, wherein the accelerator is adapted to be reconfigured between different stencil compute kernels.
10. The accelerator according to clause 7, wherein the accelerator is adapted for an overlapping of data fetching from an accelerator external memory for a next stencil computing cycle and a current stencil computing cycle across the entire grid.
11. A method for solving partial differential equations using a coarse-grained reconfigurable array accelerator for problems on a regular grid, the regular grid comprising grid cells being representative for a physical natural environment, wherein a list of physical values is associated with each grid cell,
    wherein the configurable processing elements are connected in an accelerator-internal grid by an accelerator-internal interconnect system,
    wherein memory arrays comprising memory cells, the memory arrays being connected to the accelerator-internal interconnect system, the method comprising
    positioning selected ones of the memory arrays the accelerator such that they correspond to positions of the grid cells in the physical natural environment, and
    storing the list of physical values of the corresponding grid cell of the physical natural environment in each group of the memory cells.
12. The method according to clause 11, wherein the positioning of the memory arrays is equivalent to an x-y positioning of the grid cells in the physical natural environment.
13. The method according to clause 11 or 12, also comprising mapping the list of physical values of a selected grid cell of the physical natural environment to multiple memory arrays.
14. The method according to any of the clauses 11 to 13, wherein the memory arrays have multiple read and write ports.
15. The method according to any of the clauses 11 to 14, also comprising connecting a first external bus of the accelerator to an external accelerator memory.

16. The method according to any of the clauses 11 to 15, also comprising
    connecting a second external bus of the accelerator to a host computer.
17. The method according to any of the clauses 11 to 16, also comprising
    solving the PDEs using a plurality of stencil computing kernels using the accelerator.
18. The method according to clause 17, wherein a horizontal compute stencil kernel has operand access in an x-y plane, and wherein a vertical compute stencil kernel has operand access in a plane vertical to the x-y plane, and wherein the method also comprises
    determining horizontal stencil computation results and vertical stencil computation results alternatively.
19. The method according to clause 18, also comprising reconfiguring the accelerator between different stencil compute kernels.
20. A computer program product for solving partial differential equations using a coarse-grained reconfigurable array accelerator for problems on a regular grid, the regular grid comprising grid cells being representative for a physical natural environment, wherein a list of physical values is associated with each grid cell, wherein the configurable processing elements are connected to an accelerator-internal grid by an accelerator-internal interconnect system, and wherein memory arrays comprising memory cells, the memory arrays being connected to the accelerator-internal interconnect system, the computer program product comprising a computer readable storage medium having program instructions embodied therewith, the program instructions being executable by one or more computing systems or controllers to cause the one or more computing systems to:
    position selected ones of the memory arrays the accelerator such that they correspond to positions of the grid cells in the physical natural environment, and
    store the list of physical values of the corresponding grid cell of the physical natural environment in each group of the memory cells.

What is claimed is:

1. A coarse-grained reconfigurable array accelerator for solving partial differential equations for problems on a regular grid, said regular grid comprising grid cells being representative for a physical natural environment, wherein a list of physical values is associated with each grid cell, wherein said accelerator is adapted for solving said partial differential equations using a plurality of stencil computing kernels, wherein a horizontal compute stencil kernel has operand access in an x-y plane, and wherein a vertical compute stencil kernel has operand access in a plane vertical to said x-y plane, and wherein a determination of horizontal stencil computation results and vertical stencil computation results alternates, said accelerator comprising
    configurable processing elements in an accelerator-internal grid connected by an accelerator-internal interconnect system,
    memory arrays comprising memory cells, said memory arrays being connected to said accelerator-internal interconnect system, wherein selected ones of said memory arrays are positioned within said accelerator corresponding to positions of said grid cells in said physical natural environment, and wherein each group of said memory cells is adapted for storing said list of physical values of said corresponding grid cell of said physical natural environment.

2. The accelerator according to claim 1, wherein said positioning of said memory arrays is equivalent to an x-y positioning of said grid cells in said physical natural environment.
3. The accelerator according to claim 1, wherein said list of physical values of a selected grid cell of said physical natural environment is mapped to multiple memory arrays.
4. The accelerator according to claim 1, wherein said memory arrays have multiple read and write ports.
5. The accelerator according to claim 1, wherein said accelerator comprises a first external bus adapted for connecting an external accelerator memory.
6. The method according to claim 1, wherein said accelerator comprises a second external bus adapted for connecting a host computer.
7. The accelerator according to claim 1, wherein said accelerator is adapted to be reconfigured between different stencil compute kernels.
8. The accelerator according to claim 1, wherein said accelerator is adapted for an overlapping of data fetching from an accelerator external memory for a next stencil computing cycle and a current stencil computing cycle across said entire grid.
9. A method for solving partial differential equations using a coarse-grained reconfigurable array accelerator for problems on a regular grid, said regular grid comprising grid cells being representative for a physical natural environment, wherein a list of physical values is associated with each grid cell, wherein a horizontal compute stencil kernel has operand access in an x-y plane, and wherein a vertical compute stencil kernel has operand access in a plane vertical to said x-y plane,
    wherein said configurable processing elements are connected in an accelerator-internal grid by an accelerator-internal interconnect system,
    wherein memory arrays comprising memory cells, said memory arrays being connected to said accelerator-internal interconnect system, said method comprising
    positioning selected ones of said memory arrays said accelerator such that they correspond to positions of said grid cells in said physical natural environment,
    storing said list of physical values of said corresponding grid cell of said physical natural environment in each group of said memory cells,
    determining horizontal stencil computation results and vertical stencil computation results alternatively, and
    solving said PDEs using a plurality of stencil computing kernels using said accelerator.
10. The method according to claim 9, wherein said positioning of said memory arrays is equivalent to an x-y positioning of said grid cells in said physical natural environment.
11. The method according to claim 9, also comprising mapping said list of physical values of a selected grid cell of said physical natural environment to multiple memory arrays.
12. The method according to claim 9, wherein said memory arrays have multiple read and write ports.
13. The method according to claim 9, also comprising connecting a first external bus of said accelerator to an external accelerator memory.
14. The method according to claim 9, also comprising connecting a second external bus of said accelerator to a host computer.
15. The method according to claim 9, also comprising reconfiguring said accelerator different stencil compute kernels.

16. A computer program product for solving partial differential equations using a coarse-grained reconfigurable array accelerator for problems on a regular grid, said regular grid comprising grid cells being representative for a physical natural environment, wherein a list of physical values is associated with each grid cell, wherein a horizontal compute stencil kernel has operand access in an x-y plane, and wherein a vertical compute stencil kernel has operand access in a plane vertical to said x-y plane, wherein said configurable processing elements are connected to an accelerator-internal grid by an accelerator-internal interconnect system, and wherein memory arrays comprising memory cells, said memory arrays being connected to said accelerator-internal interconnect system, the computer program product comprising a computer readable storage medium having program instructions embodied therewith, said program instructions being executable by one or more computing systems or controllers to cause said one or more computing systems to position selected ones of said memory arrays said accelerator such that they correspond to positions of said grid cells in said physical natural environment, store said list of physical values of said corresponding grid cell of said physical natural environment in each group of said memory cells, determining horizontal stencil computation results and vertical stencil computation results alternatively, and solving said PDEs using a plurality of stencil computing kernels using said accelerator.

\* \* \* \* \*